United States Patent [19]

Bleys et al.

[11] Patent Number: 6,069,184
[45] Date of Patent: May 30, 2000

[54] METHOD FOR THE PREPARATION OF POLYURETHANE ELASTOMERS

[75] Inventors: Gerhard Jozef Bleys, Heverlee; Alan James Hamilton, Leefdaal; Edward Francis Cassidy, Rixensart, all of Belgium

[73] Assignee: Imperial Chemical Industries PLC, London, United Kingdom

[21] Appl. No.: 09/037,490

[22] Filed: Mar. 10, 1998

[30] Foreign Application Priority Data

Mar. 13, 1997 [EP] European Pat. Off. ............... 97104386

[51] Int. Cl.⁷ .................................................. C08G 18/14
[52] U.S. Cl. ............................ 521/159; 521/79; 521/137; 521/174; 521/67; 528/59
[58] Field of Search ............................... 528/59; 521/159, 521/174, 79, 137, 67

[56] References Cited

U.S. PATENT DOCUMENTS 4,158,087  6/1979  Wood .
4,367,259  1/1983  Fulmer et al. .
5,591,779  1/1997  Bleys et al. .......................... 521/109.1

FOREIGN PATENT DOCUMENTS 541 390    5/1993  European Pat. Off. .
57-155224  9/1982  Japan .
893 273    4/1962  United Kingdom .

*Primary Examiner*—John M. Cooney, Jr.
*Attorney, Agent, or Firm*—Pillsbury Madison & Sutro

[57] ABSTRACT

A method for the production of polyurethane elastomers by reacting an isocyanate epolymer having an isocyanate content of from 5 to 10% by weight which is the reaction product of an excessive amount of a polyisocyanate containing at least 85% by weight of 4,4'-diphenylmethane diisocyanate or a variant thereof and a polyether polyol having an average nominal hydroxyl functionality of from 2 to 4, an average hydroxyl equivalent weight of from 500 to 3000, and an oxyethylene content of from 50 to 85% by weight, with an aqueous latex to form a foam, and compressing said foam.

14 Claims, No Drawings

METHOD FOR THE PREPARATION OF POLYURETHANE ELASTOMERS

DESCRIPTION

This invention relates to a method for the preparation of polyurethane elastomers and elastomers thus obtained.

Elastomers made from polyisocyanate-based polymers are known. Generally, they are made by reacting diisocyanates with high and optionally low molecular weight isocyanate-reactive compounds having a functionality of about 2. Processing of such elastomers can be accomplished by various methods, e.g. casting, moulding or (for elastomers having thermoplastic properties) thermoplastic techniques such as injection molding, extrusion and calendering.

Compression moulding is a known processing technique for rubbers and can be used for vulcanisable polyurethane materials such as the so-called 'millable gums'.

The use of aqueous latices in combination with polyurethane forming materials for preparing PU foams is also known. For example, in U.S. Pat. No. 4,158,087 a hydrophylic prepolymer is reacted with water and a synthetic polymer latex to produce flexible hydrophylic PU foams and U.S. Pat. No. 5,312,847 discloses polyurethane, especially flexible, foams prepared by reacting a polyisocyanate with a polyahl in the presence of a blowing agent and a certain particulate organic polymer which is preferably introduced by way of an aqueous latex.

Hydrophylic isocyanate-prepolymers are known and have been used in the production of flexible foams, see e.g. WO94/29361.

In U.S. Pat. No. 5,571,529 polyurethane foams for use in wound dressings are made by mixing a hydrophylic isocyanate-capped prepolymer with water in the presence of a monohydric alcohol and drying the product. Small amounts of a rubber, preferably an acrylic-based rubber in the form of a latex, may be added to the reaction mixture.

It has now surprisingly been found that elastomers having valuable properties can successfully be produced by compression moulding certain flexible polyurethane foams.

The invention thus concerns a method for the production of polyurethane elastomers by reacting an isocyanate prepolymer having an isocyanate content of from 5 to 10% by weight which is the reaction product of an excessive amount of a polyisocyanate containing at least 85% by weight of 4,4'-diphenylmethane diisocyanate or a variant thereof and a polyether polyol having an average nominal hydroxyl functionality of from 2 to 4, an average hydroxyl equivalent weight of from 500 to 3000, and an oxyethylene content of from 50 to 85% by weight, with an aqueous latex to form a foam, and compressing said foam.

The term "average nominal hydroxyl functionality" is used herein to indicate the average functionality (number of hydroxyl groups per molecule) of the polyether polyols on the assumption that the average functionality of the polyether polyols is identical with the average functionality (number of active hydrogen atoms per molecule) of the initiator(s) used in their preparation although in practice it will often be somewhat less because of some terminal unsaturation.

The polyisocyanate used in the preparation of the isocyanate prepolymer preferably contains 90 and more preferably 95% by weight of 4,4'-diphenyl-methane diisocyanate. It may consist essentially of pure 4,4'-diphenylmethane diisocyanate or mixtures of that diisocyanate with one or more other organic polyisocyanates, especially other diphenylmethane diisocyanate isomers, for example the 2,4'-isomers optionally in conjunction with the 2,2'-isomer. The polyisocyanate may also be an diphenylmethane diisocyanate (MDI) variant derived from a polyisocyanate composition containing at least 85% by weight of 4,4'-diphenylmethane diisocyanate. MDI variants are well known in the art and, for use in accordance with the invention, particularly include liquid products obtained by introducing uretonimine and/or carbodiimide groups into said polyisocyanate composition and/or by reacting such a composition with on or more polyols. Preferably, the polyisocyanate has a functionality of 2.05 or less and most preferably of 2.00 and most preferably is 4,'-MDI.

Polyether polyols used in the preparation of the isocyanate prepolymers are preferably poly(oxyethylene-oxypropylene) polyols having the required average nominal hydroxyl functionality, average hydroxyl equivalent weight and oxyethylene content.

Suitable polyether polyols may be obtained in conventional manner by reacting ethylene and propylene oxides simultaneously and/or sequentially in any order with an initiator such as water, a polyol, a hydroxylamine, a polyamine and the like having from 2 to 6 active hydrogen atoms or mixtures of such initiators.

In order to obtain an average nominal hydroxyl functionality of from 2 to 4 a polyether polyol having an average nominal hydroxyl functionality may be used or a mixture of polyether polyols having an average nominal hydroxyl functionality of from 2 to 6 provided the mixture is in the above 2 to 4 average nominal hydroxyl functionality range.

If desired, the polyether polyol (or one or more of the polyether polyols when a mixture of such is used) may contain dispersed polymer particles. Such polymer-modified polyols have been fully described in the prior art and include products obtained by the in situ polymerisation of one or more vinyl monomers, for example acrylonitrile and styrene, in polyether polyols or by the in situ reaction between a polyisocyanate and an amino- or hydroxy-functional compound for example triethanolamine, in the polyether polyol.

Preferred polyether polyols have a nominal hydroxyl functionality of from 2 to 3 and an average hydroxyl equivalent weight from 1000 to 2000. It is most preferred that the polyether polyols have a nominal hydroxyl functionality of 2 and an average hydroxyl equivalent weight from 1200 to 1600. The oxyethylene content is preferably from 60 to 80% by weight.

The isocyanate prepolymers are conventionally prepared by reacting the polyisocyanates and the polyether polyols at relative amounts so as to obtain an isocyanate content of 5 to 10% by weight at a temperature preferably between 40 and 80EC. The prepolymers so prepared are liquid at ambient conditions. To the prepolymers so prepared low amounts (up to 30% by weight) of MDI or a variant thereof may be added provided the 4,4'-MDI content remains above 85% by, weight calculated on all polyisocyanate used and provided the average isocyanate functionality of the added polyisocyanate is less than 2.2.

The prepolymer preferably has a viscosity of at most 10.000 mPa.s at 25° C.

At least 20 parts by weight of the aqueous latex is reacted with 100 parts by weight of the isocyanate prepolymer. It is preferred to react 20–500, and more preferably 75–150 parts by weight of aqueous latex with 100 parts by weight of the isocyanate prepolymer.

Suitable aqueous latices include aqueous latices of natural rubber, isoprene rubber, neoprene rubber, polybutadiene rubber, styrene-butadiene rubber (SBR), nitrile rubber (NBR), isobutylene-isoprene rubber (IIR), copolymers of acrylonitrile, methacrylonitrile, acrylates, methacrylates, vinylpyridine with butadiene or 2-chloro-1,3-butadiene and chlorinated polyethylene or mixtures of any of these.

Preferred are aqueous latices of natural rubber, styrene-butadiene rubber, polybutadiene rubber, isoprene rubber or copolymers comprising acrylates.

The solids content of suitable aqueous latices is from 20 to 70% by weight. Preferred latices have a solids content of from 30 to 60% by weight.

In addition to the isocyanate prepolymer and the aqueous latex the formulations may further comprise additives commonly used in the manufacture of elastomers. Such additives include catalysts, organic or inorganic fillers, pigments, desiccants, foam stabilisers, chain extenders, cross-linking agents, internal mould release agents, surface-active agents and flame retardants. The choice of such additives and the amounts used will depend on the desired properties of the end product. If used, such additives preferably are pre-mixed with the aqueous latex. Valuable elastomers may however be obtained without any of these additives.

Preferably no additives are used except up to 5 parts by weight per 100 parts by weight of the isocyanate prepolymer of foam stabilizer. Most preferably no additives are employed.

It is preferred to dry the foams before compressing them.

The compression is usually carried out in a conventional compression mould at a pressure between 50 and 200 bar at a temperature between 100 and 250 EC. The compression time depends on the temperature and the required geometry, of the part.

The elastomers so obtained generally have an average density of from 200 to 1200 kg/m3, preferably from 300 to 1000 kg/m3, and most preferably from 400 to 700 kg/m3.

The elastomers of the present invention are useful in a wide variety of applications, such as footwear, acoustical insulation, vibration damping or carpet backing.

The following examples illustrate, but do not limit the invention. All ratios are weight ratios, unless stated otherwise.

EXAMPLES 1–3

Elastomers were obtained by compression moulding foams which were made by blending an isocyanate-prepolymer and a latex in different ratios as indicated in the Table. The isocyanate-prepolymer and the latex were mixed in a conventional manner in a low pressure PU dispensing machine. The temperature of the isocyanate-prepolymer was 45° C. and that of the latex was 20° C. The foams obtained were dried in an oven at 80° C. until no further weight loss occurred and compressed at 150° C. in a hydraulic press under a pressure of 100 bars on the spacers.

The properties that were measured and the results obtained are shown in the Table.

TABLE

| | Ex. 1 | Ex. 2 | Ex. 3 | Comp. Ex. 1 |
|---|---|---|---|---|
| Prepolymer 1 | 1 | 1 | 0.5 | — |
| Prepolymer 2 | — | — | — | 1 |
| Latex | 0.5 | 1 | 1 | 1 |
| Free rise density (kg/m3) | 84 | 104 | 125 | (*) |
| Compression moulded density (kg/m3) | 530 | 650 | 550 | |
| Asker C hardness (ASTM D2240) | 62 | 60 | 55 | |
| Tensile strength (MPa) (DIN 53571) | 1.5 | 1.0 | 0.4 | |
| Elongation at break (%) (DIN 53571) | 300 | 390 | 300 | |

(*): no foam resulted
Prepolymer 1: 'Suprasec'1002.(commercially available from ICI; Suprasec is a trade mark of Imperial Chemical Industries Ltd.)
Prepolymer 2: 4,4'-MDI/polyether polyol (fn = 3,OHv = 28,14% EO-tip) reaction product (weight ratio 75/25)
Latex: water-based acrylic latex paint (colour black; estimated water-content: 60% by weight)

The moulded parts made from the elastomers according to the invention showed a very high definition and a 'rubber-like' touch whilst no foam could be made from the comparative formulation.

We claim:

1. A method for the production of polyurethane elastomers by reacting an isocyanate prepolymer having an isocyanate content of from 5 to 10% by weight which is the reaction product of an excessive amount of a polyisocyanate containing at least 85% by weight of 4,4'-diphenylmethane diisocyanate or a variant thereof and a polyether polyol having an average nominal hydroxyl functionality of from 2 to 4, an average hydroxyl equivalent weight of from 500 to 3000, and an oxyethylene content of from 50 to 85% by weight, with an aqueous latex to form a foam, and compressing molding said foam.

2. A method according to claim 1 wherein the polyether polyol is a poly(oxyethylene-oxypropylene) polyol.

3. A method according to claim 1 wherein the polyether polyol has a nominal hydroxyl functionality of from 2 to 3 and an average hydroxyl equivalent weight of from 1000 to 2000.

4. A method according to claim 3 wherein the polyether polyol has a nominal hydroxyl functionality of from 2 to 3 an average hydroxyl equivalent weight of from 1200 to 1600.

5. A method according to claim 1 wherein the polyether polyol has an oxyethylene content of from 60 to 80% by weight.

6. A method according to claim 1 wherein the polyisocyanate contains at least 90% by weight of 4,4'-diphenylmethane diisocyanate.

7. A method according to claim 6 wherein the polyisocyanate contains at least 95% by weight of 4,4'-diphenylmethane diisocyanate.

8. A method according to claim 1 wherein the solids content of the aqueous latex is from 30 to 60% by weight.

9. A method according to claim 8 wherein the aqueous latex is selected from the group consisting of aqueous latices of natural rubber, styrene-butadiene rubber, polybutadiene rubber, isoprene rubber and copolymers comprising acrylates.

10. A method according to claim 1 wherein 20–500 parts by weight of aqueous latex is reacted with 100 parts by weight of the isocyanate prepolymer.

11. A method according to claim 10 wherein 75–150 parts by weight of aqueous latex is reacted with 100 parts by weight of the isocyanate prepolymer.

12. A method according to claim 1 wherein the foam is dried before being compression moulded.

13. An elastomer obtained by the method according to claim 1 having an average density of from 300 to 1000 kg/m3.

14. An elastomer obtained by the method according to claim 12 having a density of from 400 to 700 kg/m3.

* * * * *